DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 5, 1974

920 O.G. 9

T919,004

PROCESS FOR PREPARING A FLAME RESISTANT, HEAT TRANSFER PRINTED FABRIC

Gary L. Bond, 1352 Warpath Drive, Apt. 1, Kingsport, Tenn. 37664

Filed July 16, 1973, Ser. No. 379,874

**Int. Cl. B41m *5/18***

U.S. Cl. 117—36.2

No Drawing. 7 Pages Specification

Disclosed is a process for preparing a flame resistant, heat transfer printed fabric. According to this process a heat transfer printing paper is prepared by applying a sublimable disperse dye to selected locations of the paper and uniformly applying to the paper a sublimable organic bromine compound of at least 6 carbon atoms containing, based on the weight of the organic bromine compound, from about 40 to about 85 weight percent bromine. A polyester fabric and the heat transfer printing paper are then brought into juxtaposition and the fabric, organic bromine compound and disperse dye are heated in a temperature range of about 200–215° C. In a preferred embodiment of this process the organic bromine compound is a phosphorus-containing aliphatic bromine compound. In a still more preferred embodiment of this process the organic bromine compound is tris(2,3-dibromopropyl phosphate) and the fabric is 100% poly(ethylene terephthalate).